(12) United States Patent
Jiang

(10) Patent No.: US 6,374,219 B1
(45) Date of Patent: Apr. 16, 2002

(54) SYSTEM FOR USING SILENCE IN SPEECH RECOGNITION

(75) Inventor: Li Jiang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/026,841

(22) Filed: Feb. 20, 1998

Related U.S. Application Data

(63) Continuation-in-part of application No. 08/934,622, filed on Sep. 19, 1997, now Pat. No. 6,076,056.

(51) Int. Cl.[7] ............................................... G10L 15/04
(52) U.S. Cl. ...................... 704/255; 704/251; 704/252; 704/254
(58) Field of Search ................................ 704/251, 252, 704/253, 255, 256, 257, 242

(56) References Cited

U.S. PATENT DOCUMENTS

| | | | |
|---|---|---|---|
| 4,336,421 A | | 6/1982 | Welch et al. ............. 179/1 SD |
| 4,852,173 A | | 7/1989 | Bahl et al. ..................... 381/43 |
| 4,977,599 A | * | 12/1990 | Bahl et al. ................... 704/256 |
| 5,159,637 A | | 10/1992 | Okazaki et al. ............... 381/43 |
| 5,202,952 A | * | 4/1993 | Gillick et al. ........... 704/254 X |
| 5,613,034 A | | 3/1997 | Ney et al. ..................... 395/2.6 |
| 5,623,609 A | * | 4/1997 | Kaye et al. ............. 704/255 X |
| 5,794,197 A | * | 8/1998 | Alleva et al. ............... 704/255 |
| 5,799,278 A | * | 8/1998 | Cobbett et al. ............. 704/256 |
| 5,812,974 A | * | 9/1998 | Hemphill et al. ........... 704/256 |
| 5,848,388 A | * | 12/1998 | Power et al. ........... 704/254 X |
| 6,076,056 A | * | 6/2000 | Huang et al. ................ 704/254 |

FOREIGN PATENT DOCUMENTS

EP    0 762 358 A1    3/1997

OTHER PUBLICATIONS

Automatic Speech Segment Boundary Detection Using Markov Models, IBM Technical Disclosure Bulletin, vol. 33, No. 7, pp. 323–324, Dec. 1990.*
Jelinek et al.; Design of a Linguistic Statistical Decoder for the Recognition of Continuous Speech, IEEE Transactions on information Theory, vol. IT–21, No. 3, pp. 250–256, May 1975.*
Averbuch et al., An IBM PC Based large–vocabulary Isolated–utterance speech recognizer, ICASSP 86, Tokyo, pp. 53–56, 1986.*
"Experiments with a spoken dialogue system for taking the US census", by R.A. Cole et al., *Speech Communication*, vol. 23, No. 2, Nov. 1, 1997, pp. 243–260.
"Improvements in Beam Search for 10000–Word Continuous Speech Recognition", by H. Ney, R. Haeb–Umbach, B.–H. Tran, M. Oerder, 1992 IEEE, pp. I–9–I–12.
"Improvements on the Pronunciation Prefix Tree Search Organization", by Fil Alleva, Xuedong Huang and Mei–Yuh Hwang, 1996 IEEE, pp. 133–136.

* cited by examiner

*Primary Examiner*—William Korzuch
*Assistant Examiner*—Abul K. Azad
(74) *Attorney, Agent, or Firm*—Joseph R. Kelly; Westman, Champlin & Kelly, P.A.

(57) ABSTRACT

A system for recognizing speech based on an input data stream indicative of the speech provides possible words represented by the input data stream as a prefix tree including a plurality of phoneme branches connected at nodes. The plurality of phoneme branches is bracketed by at least one input silence branch corresponding to a silence phone on an input side of the prefix tree and at least one output silence branch corresponding to a silence phone on an output side of the prefix tree. The prefix tree is traversed to obtain a word that is likely represented by the input data stream. The silence phones provided in the prefix tree can vary based on context.

23 Claims, 7 Drawing Sheets

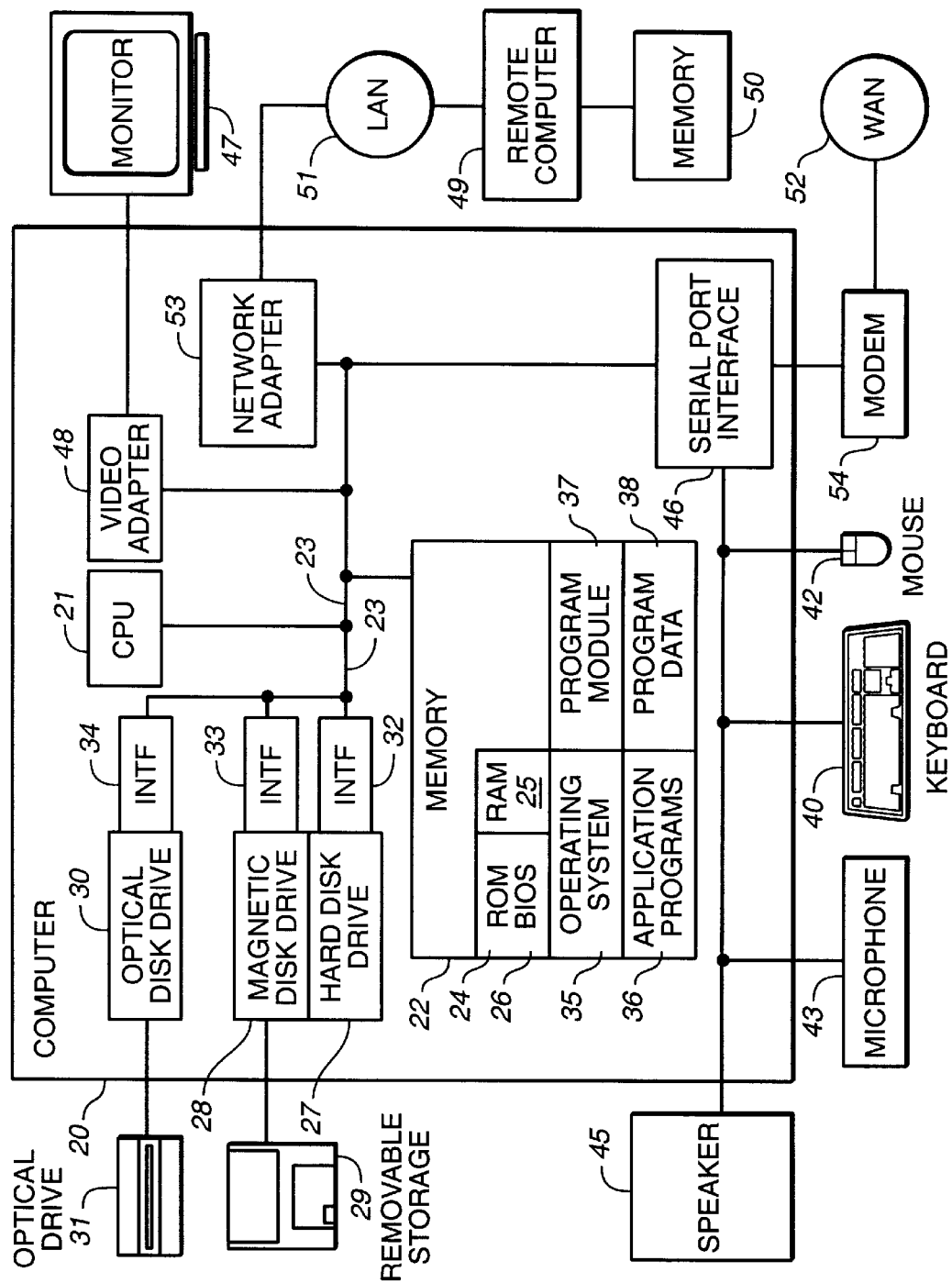
FIG._1

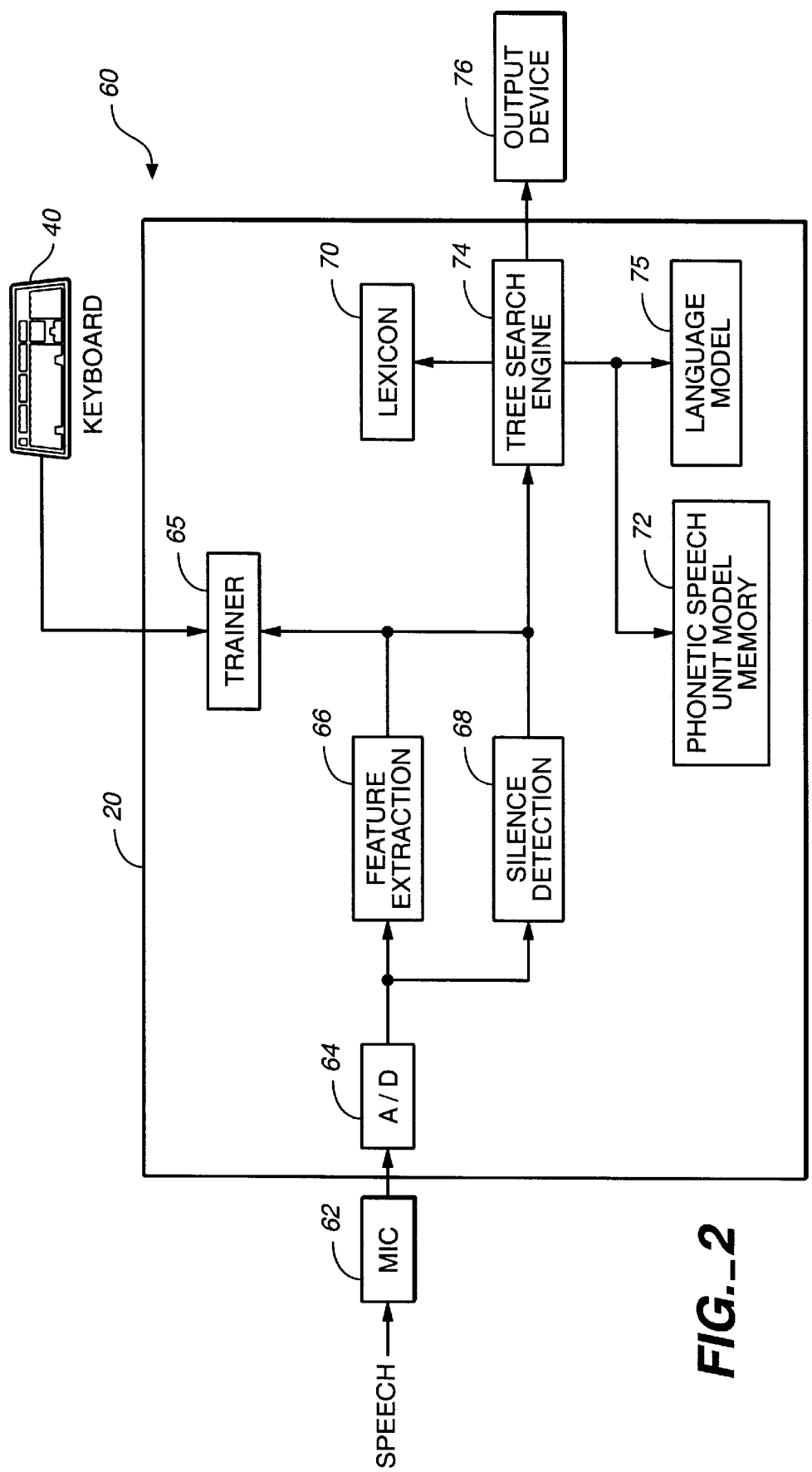
FIG._2

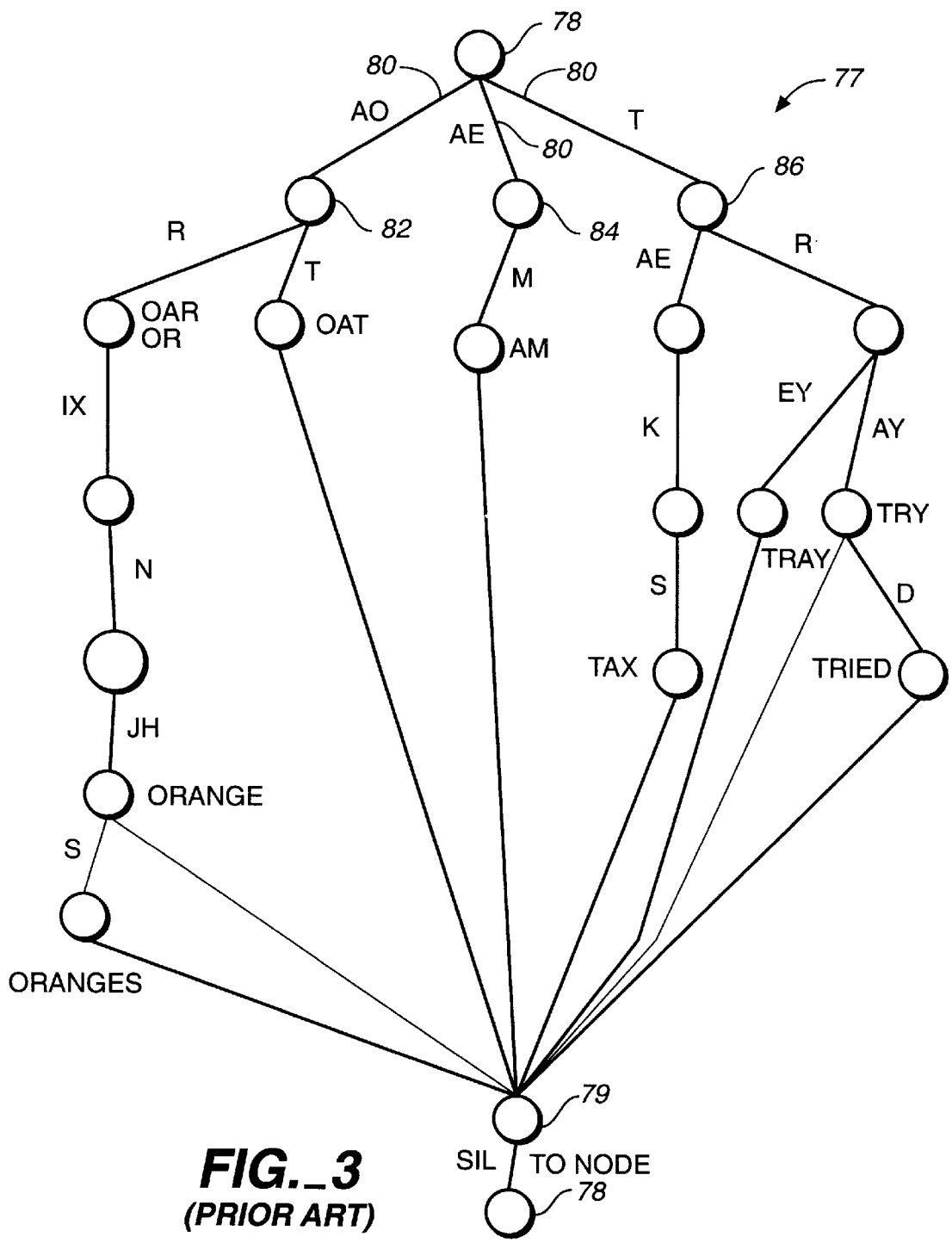
FIG._3
*(PRIOR ART)*

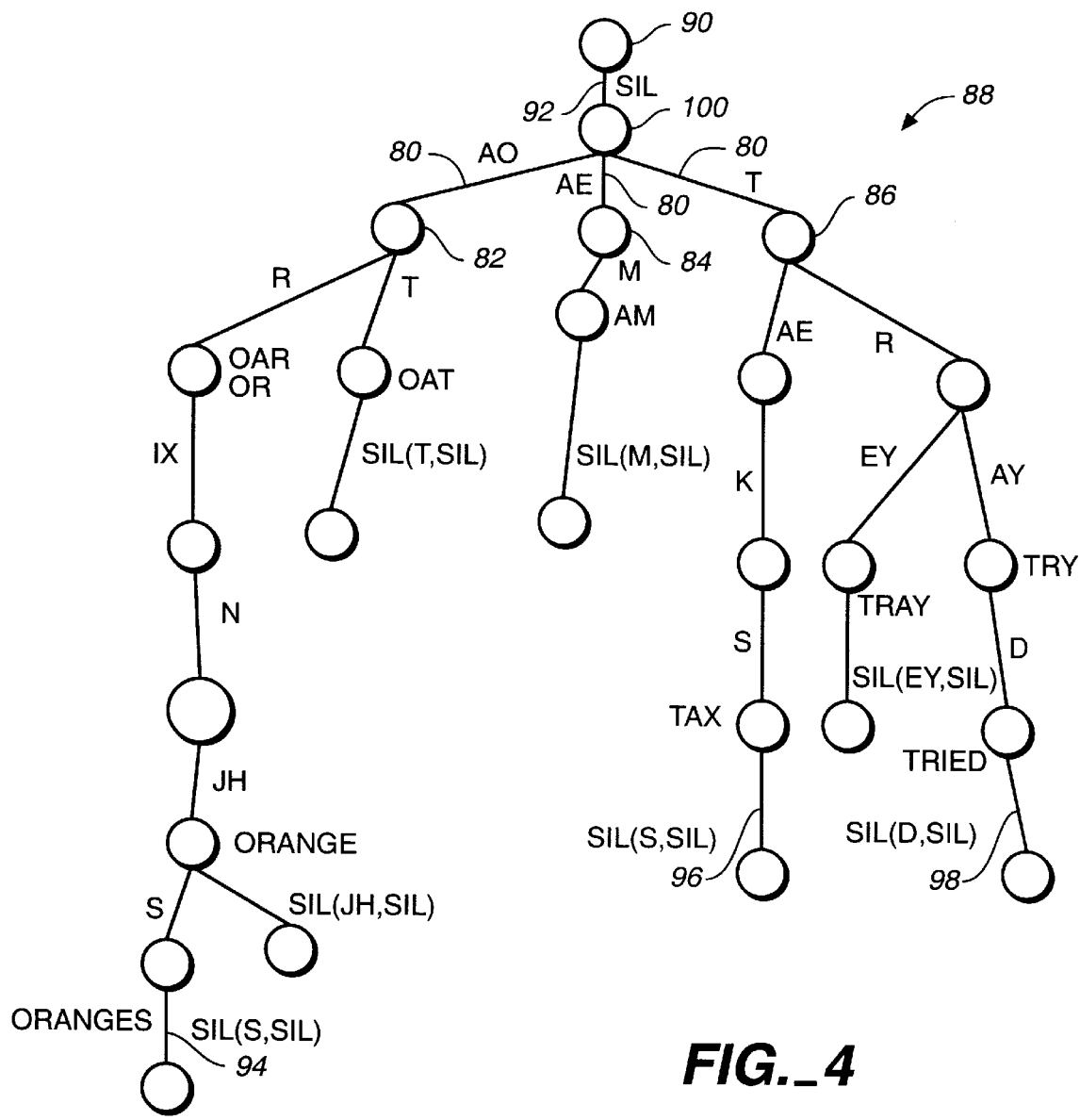
FIG._4

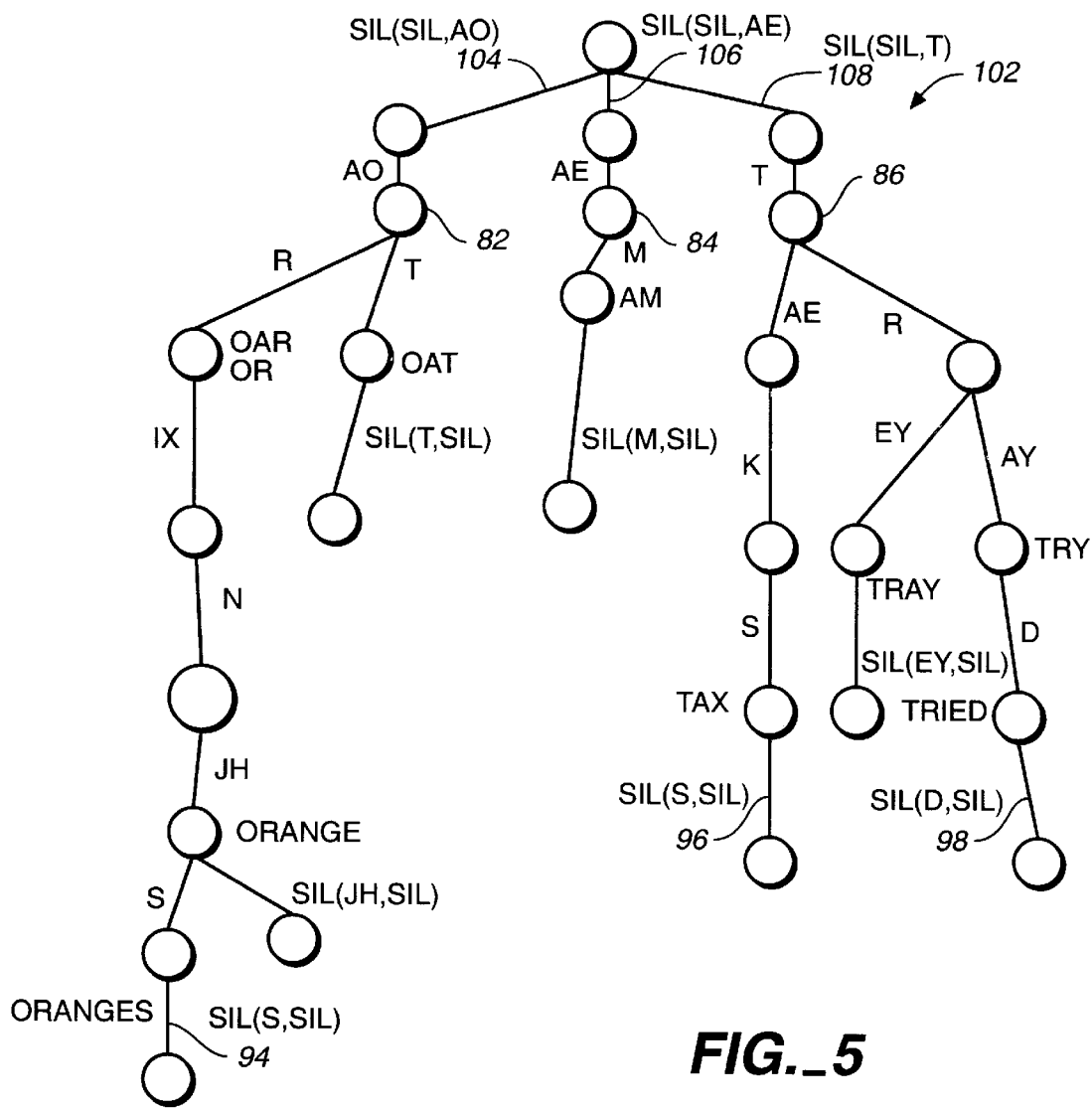
FIG._5

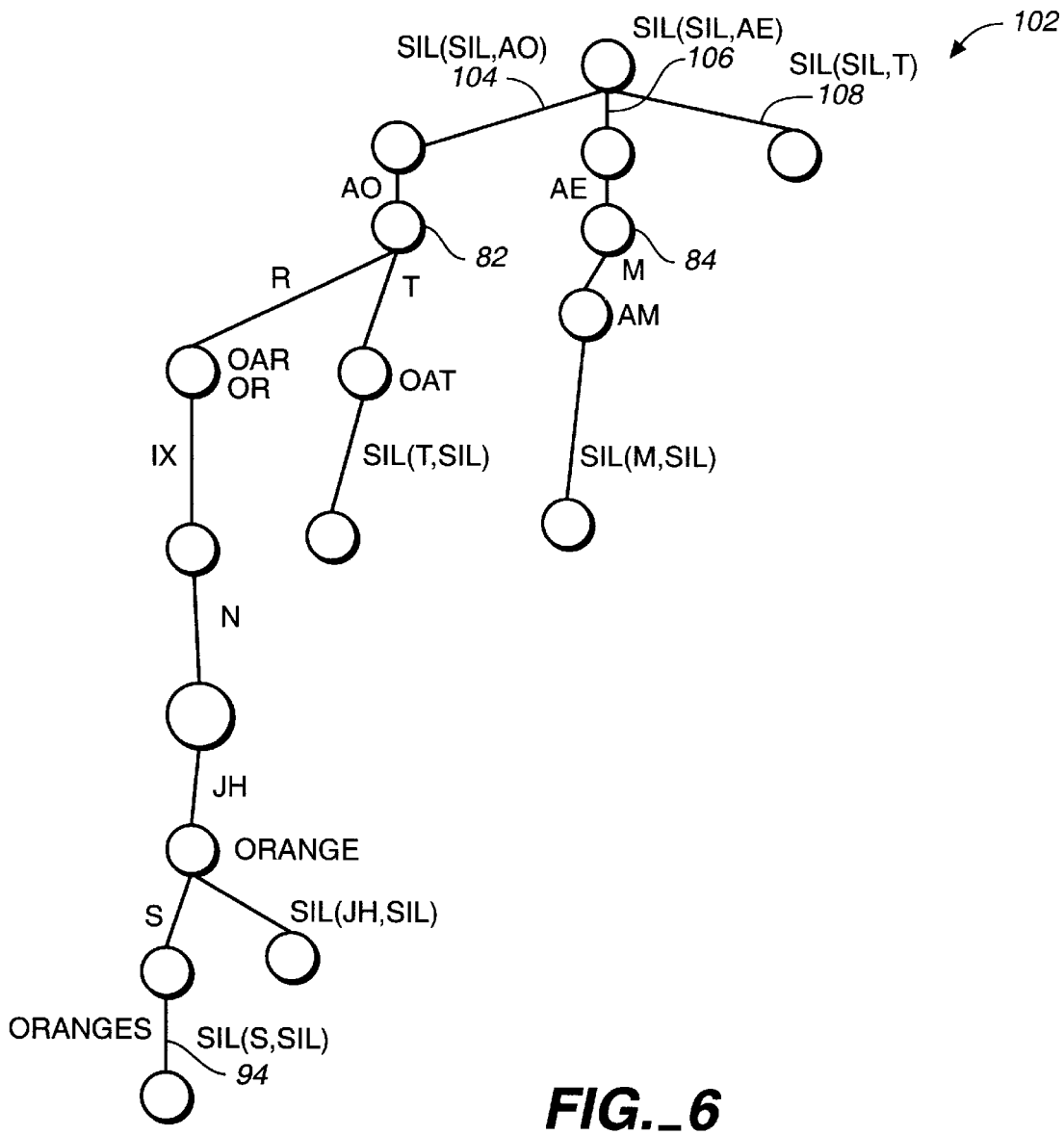
FIG._6

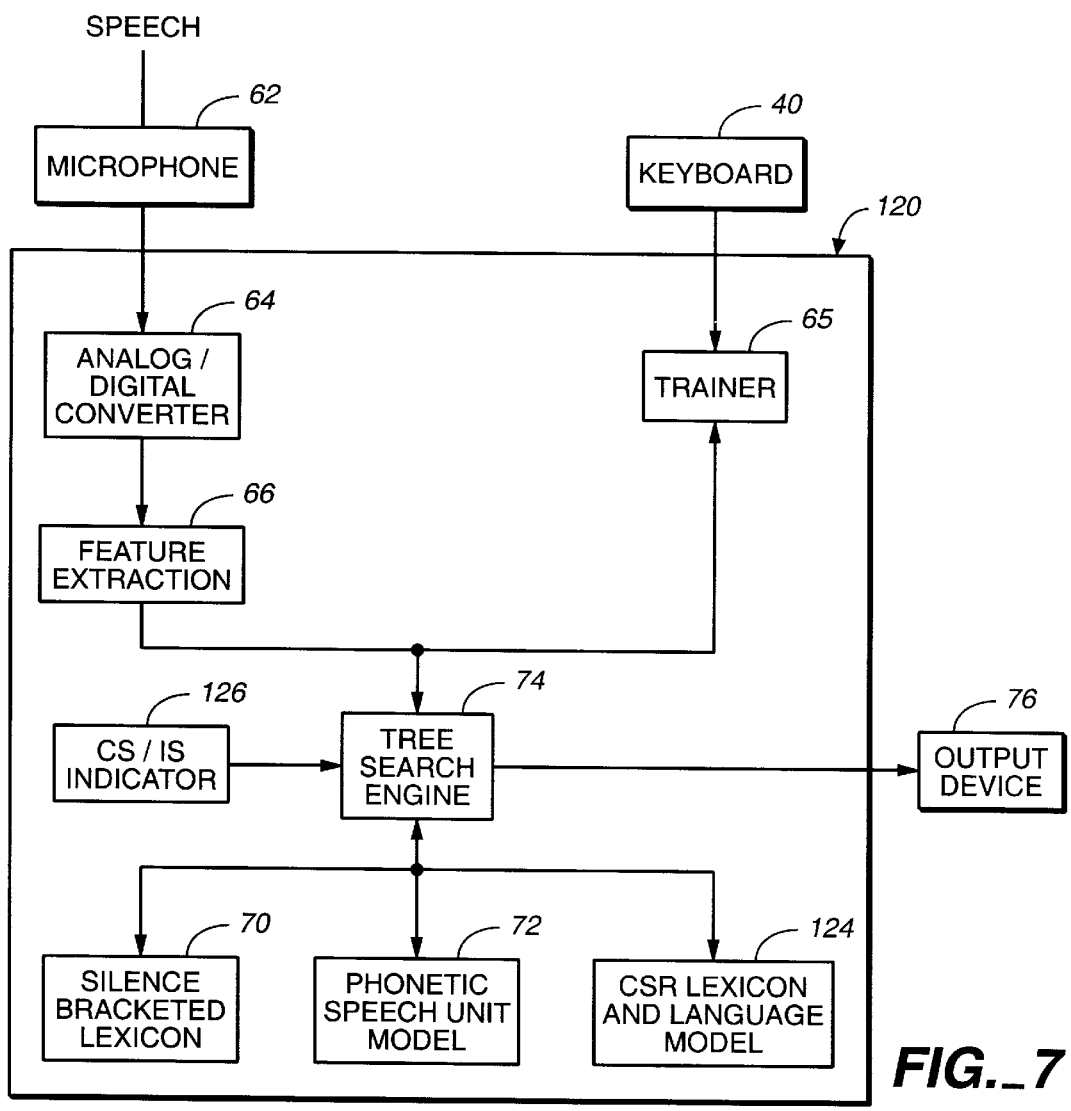
FIG._7

SYSTEM FOR USING SILENCE IN SPEECH RECOGNITION

REFERENCE TO RELATED APPLICATION

The present application is a continuation-in-part of and, claims priority from, U.S. patent application Ser. No. 08/934,622, filed Sep. 19, 1997 now U.S. Pat. No. 6,076,056, entitled SPEECH RECOGNITION SYSTEM FOR RECOGNIZING CONTINUOUS AND ISOLATED SPEECH, now U.S. Pat. No. 6,076,056, issued to Huang et al.

BACKGROUND OF THE INVENTION

The present invention relates to computer speech recognition. More particularly, the present invention relates to computer speech recognition performed by conducting a prefix tree search of a silence bracketed lexicon.

The most successful current speech recognition systems employ probabilistic models known as hidden Markov models (HMMs). A hidden Markov model includes a plurality of states, wherein a transition probability is defined for each transition from each state to every state, including transitions to the same state. An observation is probabilistically associated with each unique state. The transition probabilities between states (the probabilities that an observation will transition from one state to the next) are not all the same. Therefore, a search technique, such as a Viterbi algorithm, is employed in order to determine a most likely state sequence for which the overall probability is maximum, given the transition probabilities between states and the observation probabilities.

A sequence of state transitions can be represented, in a known manner, as a path through a trellis diagram that represents all of the states of the HMM over a sequence of observation times. Therefore, given an observation sequence, a most likely path through the trellis diagram (i.e., the most likely sequence of states represented by an HMM) can be determined using a Viterbi algorithm.

In current speech recognition systems, speech has been viewed as being generated by a hidden Markov process. Consequently, HMMs have been employed to model observed sequences of speech spectra, where specific spectra are probabilistically associated with a state in an HMM. In other words, for a given observed sequence of speech spectra, there is a most likely sequence of states in a corresponding HMM.

This corresponding HMM is thus associated with the observed sequence. This technique can be extended, such that if each distinct sequence of states in the HMM is associated with a sub-word unit, such as a phoneme, then a most likely sequence of sub-word units can be found. Moreover, using models of how sub-word units are combined to form words, then using language models of how words are combined to form sentences, complete speech recognition can be achieved.

When actually processing an acoustic signal, the signal is typically sampled in sequential time intervals called frames. The frames typically include a plurality of samples and may overlap or be contiguous. Each frame is associated with a unique portion of the speech signal. The portion of the speech signal represented by each frame is analyzed to provide a corresponding acoustic vectors. During speech recognition, a search is performed for the state sequence most likely to be associated with the sequence of acoustic vectors.

In order to find the most likely sequence of states corresponding to a sequence of acoustic vectors, the Viterbi algorithm is employed. The Viterbi algorithm performs a computation which starts at the first frame and proceeds one frame at a time, in a time-synchronous manner. A probability score is computed for each state in the state sequences (i.e., the HMMs) being considered. Therefore, a cumulative probability score is successively computed for each of the possible state sequences as the Viterbi algorithm analyzes the acoustic signal frame by frame. By the end of an utterance, the state sequence (or HMM or series of HMMs) having the highest probability score computed by the Viterbi algorithm provides the most likely state sequence for the entire utterance. The most likely state sequence is then converted into a corresponding spoken subword unit, word, or word sequence.

The Viterbi algorithm reduces an exponential computation to one that is proportional to the number of states and transitions in the model and the length of the utterance. However, for a large vocabulary, the number of states and transitions becomes large and the computation required to update the probability score at each state in each frame for all possible state sequences takes many times longer than the duration of one frame, which is typically approximately 10 milliseconds in duration.

Thus, a technique called pruning, or beam searching, has been developed to greatly reduce computation needed to determine the most likely state sequence. This type of technique eliminates the need to compute the probability score for state sequences that are very unlikely. This is typically accomplished by comparing, at each frame, the probability score for each remaining state sequence (or potential sequence) under consideration with the largest score associated with that frame. If the probability score of a state for a particular potential sequence is sufficiently low (when compared to the maximum computed probability score for the other potential sequences at that point in time) the pruning algorithm assumes that it will be unlikely that such a low scoring state sequence will be part of the completed, most likely state sequence. The comparison is typically accomplished using a minimum threshold value. Potential state sequences having a score that falls below the minimum threshold value are removed from the searching process. The threshold value can be set at any desired level, based primarily on desired memory and computational savings, and a desired error rate increase caused by memory and computational savings.

Another conventional technique for further reducing the magnitude of computation required for speech recognition includes the use of a prefix tree. A prefix tree represents the lexicon of the speech recognition system as a tree structure wherein all of the words likely to be encountered by the system are represented in the tree structure.

In such a prefix tree, each subword unit (such as a phoneme) is typically represented by a branch which is associated with a particular phonetic model (such as an HMM). The phoneme branches are connected, at nodes, to subsequent phoneme branches. All words in the lexicon which share the same first phoneme share the same first branch. All words which have the same first and second phonemes share the same first and second branches. By contrast, words which have a common first phoneme, but which have different second phonemes, share the same first branch in the prefix tree but have second branches which diverge at the first node in the prefix tree, and so on. The tree structure continues in such a fashion such that all words likely to be encountered by the system are represented by the end nodes of the tree (i.e., the leaves on the tree).

It is apparent that, by employing a prefix tree structure, the number of initial branches will be far fewer than the typical number of words in the lexicon or vocabulary of the system. In fact, the number of initial branches cannot exceed the total number of phonemes (approximately 40–50), regardless of the size of the vocabulary or lexicon being searched. Although if allophonic variations are used, then the initial number of branches could be large, depending on the allophones used.

This type of structure lends itself to a number of significant advantages. For example, given the small number of initial branches in the tree, it is possible to consider the beginning of all words in the lexicon, even if the vocabulary is very large, by evaluating the probability of each of the possible first phonemes. Further, using pruning, a number of the lower probability phoneme branches can be eliminated very early in the search. Therefore, while the second level of the tree has many more branches than the first level, the number of branches which are actually being considered (i e., the number of hypotheses), is also reduced over the number of possible branches.

Speech recognition systems employing the above techniques can typically be classified in two types. The first type is a continuous speech recognition (CSR) system which is capable of recognizing fluent speech. The second type of system is an isolated speech recognition (ISR) system which is typically employed to recognize only isolated speech (or discreet speech), but which is also typically more accurate and efficient than continuous speech recognition systems because the search space is generally smaller. Also, isolated speech recognition systems have been thought of as a special case of continuous speech recognition, because continuous speech recognition systems generally can accept isolated speech as well. They simply do not perform as well when attempting to recognize isolated speech.

Silence information plays a role in both systems. To date, both types of speech recognition systems have treated silence as a special word in the lexicon. The silence word participates in the normal search process so that it can be inserted between words as it is recognized.

However, it is known that considering word transitions in a speech recognition system is a computationally intensive and costly process. Therefore, in an isolated speech recognition system in which silence is treated as a separate word, the transition from the silence word to all other words in the lexicon must be considered, as well as the transition from all words in the lexicon (or all remaining words at the end of the search) to the silence word.

Further, in continuous speech recognition systems, even if the system has identified that the speaker is speaking discretely, or in an isolated fashion, the CSR system still considers hypotheses which do not have silence between words. This leads to a tendency to improperly break one word into two or more words. Of course, this results in a higher error rate than would otherwise be expected. Moreover, it is computationally inefficient since it still covers part of the search space which belongs to continuous speech but not isolated speech.

In addition to employing the silence phone as a separate word in the lexicon, conventional modeling of the silence phone has also led to problems and errors in prior speech recognition systems. It is widely believed that silence is independent of context. Thus, silence has been modeled in conventional speech recognition systems regardless of context. In other words, the silence phone has been modeled the same, regardless of the words or subword units that precede or follow it. This not only decreases the accuracy of the speech recognition system, but also renders it less efficient than it could be with modeling in accordance with the present invention.

SUMMARY OF THE INVENTION

A speech recognition system recognizes speech based on an input data stream indicative of the speech. Possible words represented by the input data stream are provided as a prefix tree including a plurality of phoneme branches connected at nodes. The plurality of phoneme branches are bracketed by at least one input silence branch corresponding to a silence phone on an input side of the prefix tree and at least one output silence branch corresponding to a silence phone on an output side of the prefix tree.

In one preferred embodiment, a plurality of silence branches are provided in the prefix tree. The plurality of silence branches represent context dependent silence phones.

In another preferred embodiment of the present invention, the speech recognition system includes both a continuous speech recognition system lexicon, and an isolated speech recognition system lexicon. The system switches between using the CSR lexicon and the ISR lexicon based upon a type of speech then being employed by the user of the system.

BRIEF DESCRIPTION OF THE DRAWINGS

FIG. 1 is a block diagram of an exemplary environment for implementing a speech recognition system in accordance with the present invention.

FIG. 2 is a more detailed block diagram of a portion of the system shown in FIG. 1.

FIG. 3 is a diagram illustrating a prior art prefix tree.

FIG. 4 is a diagram illustrating one embodiment of a prefix tree in accordance with the present invention.

FIG. 5 is a diagram illustrating another embodiment of a prefix tree in accordance with the present invention.

FIG. 6 is a diagram illustrating the prefix tree shown in FIG. 5, employing a pruning technique in accordance with another aspect of the present invention.

FIG. 7 is a block diagram of another embodiment of a speech recognition system in accordance with another aspect of the present invention.

DETAILED DESCRIPTION OF THE PREFERRED EMBODIMENTS

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40, pointing device 42 and microphone 62. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as speaker 45 and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes any or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

FIG. 2 illustrates a block diagram of a speech recognition system 60 in accordance with one aspect of the present invention. Speech recognition system 60 includes microphone 62, analog-to-digital (A/D) converter 64, training module 65, feature extraction module 66, silence detection module 68, lexicon storage module 70, phonetic speech unit storage module 72, tree search engine 74, and output device 76. In addition, a language model storage module 75 can also be provided and accessed by search engine 74. It should be noted that the entire system 60, or part of system 60, can be implemented in the environment illustrated in FIG. 1. For example, microphone 62 may preferably be provided as an input device to personal computer 20, through an appropriate interface, and through A/D converter 64. Training module 65, feature extraction module 66 and silence detection module 68 may be either hardware modules in computer 20, or software modules stored in any of the information storage devices disclosed in FIG. 1 and accessible by CPU 21 or another suitable processor. In addition, lexicon storage module 70 and phonetic speech unit storage module 72 are also preferably stored in any suitable memory devices shown in FIG. 1. Further, tree search engine 74 is preferably implemented in CPU 21 (which may include one or more processors) or may be performed by a dedicated speech recognition processor employed by personal computer 20. In addition, output device 76 may, in one preferred embodiment, be implemented as monitor 47, or as a printer, or any other suitable output device.

In any case, during speech recognition, speech is input into system 60 in the form of an audible voice signal provided by the user to microphone 62. Microphone 62 converts the audible speech signal into an analog electronic signal which is provided to A/D converter 64. A/D converter 64 converts the analog speech signal into a sequence of digital signals which is provided to feature extraction module 66. In a preferred embodiment, feature extraction module 66 is a conventional array processor which performs spectral analysis on the digital signals and computes a magnitude value for each frequency band of a frequency spectrum. The signals are, in one preferred embodiment, provided to feature extraction module 66 by A/D converter 64 at a sample rate of approximately 16 kHz, implementing A/D converter 64 as a commercially available, well known A/D converter.

Feature extraction module 66 divides the digital signal received from A/D converter 64 into frames which include a plurality of digital samples. Each frame is approximately 10 milliseconds in duration. The frames are then preferably encoded by feature extraction module 66 into a feature vector reflecting the spectral characteristics for a plurality of frequency bands. In the case of discrete and semi-continuous hidden Markov modeling, feature extraction module 66 also preferably encodes the feature vectors into one or more codewords using vector quantization techniques and a codebook derived from training data. Thus, feature extraction module 66 provides, at its output the feature vectors (or codewords) for each spoken utterance. The feature extraction module 66 preferably provides the feature vectors (or codewords) at a rate of one codeword approximately every 10 milliseconds.

Output probability distributions are then preferably computed against hidden Markov models using the feature vector (or codewords) of the particular frame being analyzed. These probability distributions are later used in performing a Viterbi or similar type of technique.

As feature extraction module 66 is processing the digital samples from A/D converter 64, silence detection module 68 is also processing the samples. Silence detection module 68 can either be implemented on the same, or a different, processor as that used to implement the feature extraction module 66. Silence detection module 68 operates in a well known manner. Briefly, silence detection module 68 processes the digital samples provided by A/D converter 64, so as to detect silence, in order to determine boundaries between words being uttered by the user. Silence detection module 68 then provides a boundary detection signal to tree search engine 74 indicative of the detection of a word boundary.

Upon receiving the codewords from feature extraction module 66, and the boundary detection signal provided by silence detection module 68, tree search engine 74 accesses information stored in the phonetic speech unit model memory 72. Memory 72 stores phonetic speech unit models, such as hidden Markov models, which represent speech units to be detected by system 60. In one preferred embodiment, the phonetic models stored in memory 72 include HMMs which represent phonemes. Based upon the HMMs stored in memory 72, tree search engine 74 determines a most likely phoneme represented by the codeword received from feature extraction module 66, and hence representative of the utterance received by the user of the system. It should also be noted that the proper phoneme can be chosen in any number of ways, including by examining the particular senones calculated for each state of the HMMs for each phoneme. Also, a phonetic HMM tree search can be performed in order to find the proper phoneme.

Tree search engine 74 also accesses the lexicon stored in memory 70. The information received by tree search engine 74 based on its accessing of the phonetic speech unit models in memory 72 is used in searching lexicon 70 to determine a word which most likely represents the codewords received by feature extraction module 66 between word boundaries as indicated by silence detection module 68. Also, search engine 74 preferably accesses a language model in module 75, such as a 60,000 word trigram language model derived from North American Business News Corpus and set out in greater detail in a publication entitled CSR-III Text Language Model, University of Penn., 1994. The language model is used in identifying a most likely word or word sequence represented by the input data. The word or word sequence determined is thus most likely representative of the utterance received by the user. The word or word sequence is then output by tree search engine 74 to output device 76.

In a preferred embodiment, lexicon 70 contains information which is representative of all of the words in the vocabulary of speech recognition system 60. The words are preferably presented to tree search engine 74 in the form of a prefix tree which can be traversed from a root to a leaf (or to an internal word node) to arrive at the word most likely indicative of the utterance of the user.

FIG. 3 illustrates a prefix tree used in accordance with prior art speech recognition systems. For the sake of clarity, only a portion of a prefix tree is illustrated by FIG. 3. A root node (or input node) 78 is encountered at a first word boundary. A plurality of branches 80 lead from root node 78 to a remainder of the prefix tree. Each of the plurality of branches is associated with a phoneme. In FIG. 3, the branches leaving root node 78 represent only the phonemes represented by the letters AO, AE, and T. The tree extends through other nodes and branches and terminates in an output node 79.

In accordance with one searching technique, as tree 77 is traversed from the input node 78 to the output node 79, a score is assigned to each node connected to a phoneme branch then under consideration by the speech recognition system. The score is indicative of a likelihood that the particular phoneme being examined is the actual phoneme indicated by the codeword received from the feature extraction module 66.

For example, if the word ORANGE were input into system 60 by the user, feature extraction module 66 would likely divide the word ORANGE into codewords indicative of the phonemes represented as follows: AO, R, IX, N, JH. As the tree search engine traverses tree 77, it preferably computes a score, for each phoneme branch considered in tree 77, wherein the score represents the likelihood that the particular phoneme encoded by the codeword corresponds to the phoneme for the branch under consideration. Thus, tree search engine 74 computes a score for node 82 which indicates that the first codeword under consideration is highly likely to be represented by the AO phoneme corresponding to the branch under consideration. Tree search engine 74 also preferably computes a score for each of the other nodes 84 and 86 in tree 77, wherein the score is indicative of the likelihood that the codeword being analyzed is represented by the phonemes AE, and T. Under ideal circumstances, the score assigned to nodes 84 and 86 is lower than the score assigned to node 82.

As search engine 74 traverses tree 77, it preferably assigns a score to each node in tree 77 which is based on the likelihood that the present codeword (output probability distributions) under analysis is represented by the phoneme corresponding to the branch in tree 77 then being considered, and based on the score assigned to nodes further up the tree which are connected by phoneme branches to the present node. This is all done in a known manner.

In addition, a pruning technique can be used. Pruning is accomplished by comparing, at each node, the scores assigned to that node, with the largest score on any of the other nodes corresponding to the frame being considered. If the score at a particular node is sufficiently low compared to the maximum score for other corresponding nodes in tree 77, it is assumed that the branches leading to the node under consideration (the node with the lower score) will not likely be part of the completed most likely phoneme sequence (i.e., the phonemes in that sequence will not likely be part of the final word recognized by the system). Thus, that branch is dropped (or pruned) from tree 77 and is no longer considered in further processing.

In an isolated speech recognition system, after tree 77 has been traversed, a silence phone must be enforced at the word boundary. Thus, output node 79 leads to a silence branch, which branches back to input node 78 (if tree 77 is a re-entrant tree) such that recognition can begin again for the next word following the current word boundary. However, this can lead to somewhat suboptimal performance for a number of reasons.

First, all of the leaves on tree 77 must lead to output node 79 such that the silence phone can be enforced at the word boundary. However, it is desirable in instances where a language model is used to determine word sequences, that N-best hypotheses are maintained after traversing tree 77. It is difficult and inefficient for the Viterbi algorithm used in traversing tree 77 to maintain the N-best hypotheses if all leaves in tree 77 must lead to single output node 79. Further, the silence phone in such prior art prefix trees is modeled the same regardless of its context. It has been recognized by the inventors of the present invention that the silence phone can vary significantly based on context. Modeling the silence phone regardless of context can lead to errors in recognition. Also, it is widely recognized that consideration of interword transitions in a speech recognition systems is both complicated and time consuming. However, when utilizing tree 77 in accordance with the prior art, a transition must be made (even in isolated speech recognition systems) from the silence phone, to a recognized word, and back to the silence phone, for each word recognized by the system. This can lead to an increased error rate, and results in inefficiency in the system.

FIG. 4 illustrates one preferred embodiment of a prefix tree 88 in accordance with the present invention. Tree 88 illustrates that the lexicon used in recognizing speech in accordance with one aspect of the present invention is a silence bracketed lexicon. In other words, in order to traverse tree 88, the tree is entered at root node 90. In the embodiment illustrated in FIG. 4, root node 90 is connected to a silence branch 92 which represents a silence phone and which is connected, in turn, to phoneme branches and the remainder of the prefix tree. Each leaf on the tree (which represents a word) is connected to a silence branch, such as branches 94, 96, and 98, each of which are associated with a silence phone. By employing prefix tree 88, the present system provides a silence bracketed lexicon wherein every word in the lexicon is bracketed by silence phone.

In the embodiment shown in FIG. 4, only a single silence phone is connected at the input side of tree 88. This top level silence branch 92 is connected at node 100 to the plurality of phoneme branches which formed the first level of tree 77 in FIG. 3. Silence phones at the end of tree 88 are, in this preferred embodiment, context dependent silence phones. In other words, during training of the phonetic models in system 60 (described in greater detail below), the speech provided to system 60 to train the phonetic models includes a plurality of context dependent silence phones which are modeled and stored in memory 72. When a word boundary is detected by silence detection module 68, tree search engine 74 locates the appropriate silence phone using the phonetic silence phone models in memory 72 and using prefix tree 88.

By employing prefix tree 88, which presents a silence bracketed lexicon, a number of advantages are obtained. First, the silence bracketed lexicon eliminates the need to consider interword transitions. In other words, in the prior system illustrated by FIG. 3, transitions from a word to a silence phone and back to a word needed to be accommodated by the system. However, by embedding silence as part of the word in the lexicon, there is no need for these interword transitions. Instead, the only transitions which must be accommodated are the transitions from one actual spoken word to another. Further, using the embodiment illustrated in FIG. 4, every word in the lexicon represented by tree 88 shares the input silence phone 92. Thus, there is very little extra cost for embedding the beginning silence phone in the word. Also, since each of the words represented by tree 88 end with an independent silence phone, the Viterbi algorithm can more efficiently maintain the N-best hypotheses after traversing tree 88. This lends itself to more efficient deployment of the Viterbi algorithm in a system which also uses language models (or other suitable models) for determining a most likely word sequence.

Another significant advantage obtained by the present invention, as illustrated in FIG. 4, is obtained when the system is used in a continuous speech recognition system. Typical continuous speech recognition system architectures are configured to handle cross-word context. However, this can result in higher error rates when the continuous speech recognition system is applied to isolated speech. For example, when the speaker is speaking in an isolated or discrete manner into the continuous speech recognition system, the cross-word context accommodation features of the continuous speech recognition system may tend to incorrectly break one word into two or more words. However, when the system detects that the user is speaking in an isolated or discrete fashion, a system in accordance with one aspect of the present invention (and further described with respect to FIG. 7) reconfigures itself to employ the silence bracketed lexicon. By enforcing the silence at word boundaries, the present system ensures that no cross-word context is considered, so the continuous speech recognition system employing the present invention can better handle isolated speech more efficiently and more accurately.

FIG. 5 illustrates another embodiment of a prefix tree 102 in accordance with another aspect of the present invention. Prefix tree 102 is similar to prefix tree 88 shown in FIG. 4, and similar items are similarly numbered. However, instead of having only a single silence branch 92 at the input end of tree 102, a plurality of silence branches, such as 104, 106 and 108, are included at the input end of tree 102. The silence branches 104, 106, and 108 correspond to context dependent silence phones. Therefore, instead of having only context dependent silence phones at the output end of the tree (such as in tree 88 illustrated in FIG. 4) tree 102 also has context dependent silence phones at the input end of the tree. The silence branches at the input end of tree are connected to the phoneme branches which are connected to the remainder of the tree. As with tree 88, tree 102 terminates in leaves which represent silence phones at the end of each word in the lexicon.

Thus, the silence bracketed lexicon represented by tree 102 brackets the entries in the lexicon by context dependent silence phones. This leads to a number of significant advantages. The context dependent silence branches 104, 106 and 108 split the single top level silence branch 92 of tree 88 into multiple context-dependent silence phones. This assists in the pruning operation, and thus makes the overall system more efficient. For example, the tree search engine 74 can begin assigning scores to the nodes connected to the silence branches 104, 106 and 108, rather than beginning by assigning scores to the nodes connected to the first phoneme branches in the tree. This allows segments of tree 102 to be pruned or eliminated earlier in the search process which reduces the search space more quickly.

FIG. 6 illustrates tree 102 (shown in FIG. 5) with a number of the silence branches (and the branches connected thereto) pruned from the tree. After considering each of the silence branches, representing the context dependent silence phones at the input side of tree 102, a score is assigned to each node connected to those silence branches. Then, in one preferred embodiment, each of the scores for each node are compared to the maximum score assigned to any node on that level of the tree. A predetermined threshold level can be set, or an adaptive threshold level can be implemented, for the comparison. If the score for the node being compared is less than the maximum score by the threshold level, all subsequent branches connected to that node are pruned from the tree, thereby drastically reducing the search space for any given search. FIG. 6 illustrates that the score assigned to the node for silence branch 108 is sufficiently low that the remainder of the branches of the tree have been pruned from the tree.

Of course, a decision need not be made at the first level in the tree. Also, any particular threshold level can be employed in the search strategy. The lower the threshold level, the more hypotheses will be retained throughout the search, and thus the more accurate the recognition system will be. However, the threshold level is preferably determined empirically so as to gain an increase in computational savings, while significantly reducing the error rate associated with the pruning technique.

In order to train the system shown in FIG. 2, training words are spoken into system 60 by the user. The training words comprise a set of training data which is converted to digital samples by A/D converter 64 and then to codewords by feature extraction module 66. The codewords (or output probability distributions) are provided to training module 65. Training module 65 also receives a phonetic transcription of each training word from the user by a user input device, such as keyboard 40. The training module 65 can be implemented on either the same processor, or a separate processor, from the remainder of the speech recognition system. One or more HMMs are created by training module 65 for each phoneme of each word in a desired vocabulary represented by the training data. The HMMs thus represent model output distributions associated with the phonemes in the vocabulary. The prefix tree is then formed, based upon the desired vocabulary, such that phonemes are structured to provide a leaf which is associated with each word in the desired vocabulary. It should also be noted that the training words (or data set) can either be received one word at a time from the microphone, as described above, or input, in its entirety by a conventional computer input device, such as a floppy disk which contains a previously produced data set.

In accordance with one aspect of the present invention, training module 65 also trains hidden Markov models for context dependent silence phones as well. The desired context dependent silence phones are represented by the training data. The modeled silence phones are also presented in the prefix tree as described above.

FIG. 7 is a block diagram of a second embodiment of a speech recognition system 120 in accordance with the present invention. System 120 is similar to system 60 and similar items are correspondingly numbered. However, system 120 is configured to accept and recognize continuous speech as well as isolated speech. Thus, system 120 includes continuous speech recognition lexicon and language model memory 124 and continuous speech (CS)/isolated speech (IS) indicator 126.

In one preferred embodiment, continuous speech recognition and language model memory 124 includes a CSR lexicon which can be presented in any suitable way, such as in a prefix tree format. Therefore, during normal, fluent speech, system 120 accesses the information presented by memory 124 in performing the speech recognition task. However, in instances where the user is speaking in an isolated or discrete manner, system 120 switches to access information presented by the silence bracketed lexicon in memory 70. Since the silence bracketed lexicon presented by memory 70 results in far more efficient and accurate recognition of isolated speech than a continuous speech lexicon, system 120 can more easily and efficiently recognize isolated speech in the midst of fluent or continuous speech.

To switch between lexicons, search engine 74 receives a CS/IS signal which indicates whether the speaker is speaking in continuous or isolated speech, from CS/IS indicator 126. CS/IS indicator 126 can be implemented in any number of suitable ways. For example, in one illustrative embodiment, CS/IS indicator 126 is simply embodied as silence detection module 68. When silence detection module 68 is detecting a great deal of silence, or pauses (the particular amount preferably being empirically determined), search engine 74 is configured to interpret that as indicating that the speaker is speaking in isolated or discrete speech patterns. In that instance, engine 74 switches to access the lexicon from memory 70, rather than from memory 124.

In accordance with one aspect of the present invention, CS/IS indicator 126 is provided in a user interface with which the user interacts to operate system 120. In one illustrative embodiment, the user interface simply provides the user with the option to select continuous or isolated speech. After the user makes that selection using any suitable user input device, the user interface provides the appropriate CS/IS signal to engine 74. In another illustrative embodiment, the user interface instructs the user to speak in continuous or isolated speech patterns based on recognition criteria. For instance, if recognition system 120 has made a large number of errors or corrections in a current word sequence, engine 74 instructs the CS/IS indicator 126 in the user interface to instruct the user to speak in an isolated fashion. Engine 74 then switches to the lexicon provided by memory 70 to obtain more accurate speech recognition until the current sequence of words has been accurately recognized. Then, engine 74 controls CS/IS indicator 126 in the user interface to instruct the user to again continue speaking in continuous speech patterns. Engine 74 returns to accessing information from the lexicon in memory 124 and continues with the speech recognition process. Of course, the system could also employ any other suitable mechanism (such as a suitable heuristic) to determine when the user has switched between continuous and isolated speech.

Therefore, it can be seen that the various features of the present invention provide significant advantages over prior art systems. For example, the silence bracketed lexicon of the present invention eliminates the need for the system to consider interword transition, since the silence phones are embedded as part of each word in the lexicon. Also, since there is an ending silence phone embedded in each word, the system can more efficiently retain N-best hypotheses after the tree has been traversed. Further, by modeling the silence phones in a context dependent fashion, the speech recognition process becomes more accurate, and pruning can be accomplished earlier in the recognition task, thus decreasing the search space and increasing efficiency. Further, by adaptively switching between a continuous speech lexicon and an isolated speech lexicon, the present system reduces the likelihood that the cross-word context accommodating features of the conventional continuous speech recognition system will generate errors when isolated speech is encountered in the recognition process. This also increases the accuracy and efficiency of the system.

Although the present invention has been described with reference to preferred embodiments, workers skilled in the art will recognize that changes may be made in form and detail without departing from the spirit and scope of the invention.

What is claimed is:

1. A method of recognizing speech based on an input data stream indicative of the speech, the method comprising:

providing possible words represented by the input data stream, and formed of phonemes, as a prefix tree including a plurality of phoneme branches connected at nodes, each phoneme branch corresponding to a phoneme, the plurality of phoneme branches being bracketed by at least one input silence branch corresponding to a silence phone on an input side of the prefix tree and at least one output silence branch corresponding to a silence phone on an output side of the prefix tree; and traversing the prefix tree to obtain a word that is likely represented by the input data stream.

2. The method of claim 1 wherein traversing the prefix tree comprises:

traversing the prefix tree by assigning a score to a plurality of successive nodes from the input side of the prefix tree to the output side of the prefix tree, the score being indicative of a likelihood that the input data is representative of the phonemes corresponding to branches leading to the nodes to which the score is then being assigned; and choosing N words corresponding to the silence nodes at the output side of the prefix tree, having scores assigned thereto which meet a threshold level, as likely words represented by the input data stream.

3. The method of claim 1 wherein providing possible words comprises:

providing the prefix tree with a plurality of silence branches on the input side of the prefix tree each silence branch being connected at nodes to at least one phoneme branch.

4. The method of claim 3 wherein providing the prefix tree with a plurality of silence branches comprises:

providing the prefix tree with the plurality of silence branches wherein the silence phones represented by the plurality of silence branches vary based on context.

5. The method of claim 3 wherein providing possible words comprises:

providing the prefix tree with the plurality of silence branches on the input side of the prefix tree, a silence phone represented by each silence branch varying from phones represented by other silence branches based on the phonemes to which the silence branch is connected.

6. The method of claim 3 wherein traversing the prefix tree comprises:

assigning a score to the nodes connected between the silence branches and the phoneme branches indicative of a likelihood that the input data is representative of the silence phone corresponding to the silence branch leading to the node to which the score is then being assigned.

7. The method of claim 6 wherein traversing the prefix tree comprises:

pruning branches from the prefix tree based on the scores assigned to the nodes connected between the silence branches and the phoneme branches.

8. The method of claim 7 wherein pruning comprises:

discontinuing further traversing of branches in the prefix tree leading out of nodes for which the scores assigned thereto meet a pruning threshold level.

9. A method of recognizing speech based on an input data stream indicative of the speech, the method comprising:

providing a lexicon including entries formed of possible words represented by the input data stream, the entries being bracketed by silence phones; and searching the lexicon, based on the input data stream, to determine a word likely represented by the input data stream;

wherein providing a lexicon includes providing the lexicon as a prefix tree including a plurality of phoneme branches connected at nodes, each phoneme branch corresponding to a phoneme, the plurality of phoneme branches being bracketed by at least one input silence branch corresponding to a silence phone on an input side of the prefix tree and at least one output silence branch corresponding to a silence phone on an output side of the prefix tree.

10. The method of claim 9 wherein providing the lexicon comprises:

providing the prefix tree with a plurality of silence branches on the input side of the prefix tree each silence branch being connected at nodes to at least one phoneme branch.

11. The method of claim 10 wherein providing the prefix tree with a plurality of silence branches comprises:

providing the prefix tree with the plurality of silence branches wherein the silence phones represented by the plurality of silence branches vary based on context.

12. The method of claim 10 wherein providing the lexicon comprises:

providing the prefix tree with the plurality of silence branches on the input side of the prefix tree, a silence phone represented by each silence branch varying from phones represented by other silence branches based on the phonemes to which the silence branch is connected.

13. The method of claim 10 wherein traversing the prefix tree comprises:

assigning a score to the nodes connected between the silence branches and the phoneme branches indicative of a likelihood that the input data is representative of the silence phone corresponding to the silence branch leading to the node to which the score is then being assigned.

14. A method of recognizing speech from input data indicative of the speech, the method comprising:

providing speech unit models representative of speech units;

providing silence models of context dependent silence phones; and selecting speech units and context dependent silence phones, based on the input data and based on the speech unit models and the silence models, that are likely represented by the input data; wherein providing the speech unit models and providing the silence models comprises providing the speech unit models and the silence models as a prefix tree including a plurality of phoneme branches connected at nodes, each phoneme branch corresponding to a phoneme, the plurality of phoneme branches being bracketed by at least one input silence branch corresponding to a silence phone on an input side of the prefix tree and at least one output silence branch corresponding to a silence phone on an output side of the prefix tree.

15. The method of claim 14 wherein selecting speech units and context dependent silence phones comprises:

traversing the prefix tree to obtain a word that is likely represented by the input data stream.

16. A computer readable medium having stored thereon components comprising:

a prefix tree including a plurality of phonemes corresponding to phoneme branches connected at nodes, the plurality of phoneme branches being bracketed by at least one input silence branch corresponding to a silence phone on an input side of the prefix tree and at least one output silence branch corresponding to a silence phone on an output side of the prefix tree.

17. The computer readable medium of claim 16 wherein the components further comprise:

a traversing component configured to traverse the prefix tree to obtain a word that is likely represented by an input data stream which is indicative of speech to be recognized.

18. The computer readable medium of claim 17 wherein the prefix tree further includes:

a plurality of silence branches on the input side of the prefix tree, each silence branch being connected at a node to at least one of the phoneme branches.

19. The computer readable medium of claim 18 wherein silence phones represented by the plurality of silence branches vary based on context.

20. The computer readable medium of claim 17 wherein the plurality of silence branches are provided on the input side of the prefix tree and wherein a silence phone represented by a silence branch varies from silence phones represented by other silence branches based on the phonemes to which the silence branch is connected.

21. A computer readable medium having stored thereon a data structure, comprising:

a first data portion containing data indicative of at least one input silence phone;

a second data portion containing data indicative of a plurality of phonemes;

a third data portion containing data indicative of at least one output silence phone; and the first, second and third data portions being arranged to function, when traversed, as a prefix tree which yields a word likely representative of an input data stream.

22. The computer readable medium of claim 21 wherein the first and third data portions each include a plurality of silence phones such that the prefix tree includes different input silence phones and output silence phones connected to each of the plurality of phonemes.

23. The computer readable medium of claim 21 wherein the data in the first and third data portions is indicative of context dependent silence phones, the context dependent silence phones varying based on the phonemes to which they are connected in the prefix tree.

* * * * *

UNITED STATES PATENT AND TRADEMARK OFFICE
CERTIFICATE OF CORRECTION

PATENT NO.     : 6,374,219 B1
DATED          : April 16, 2002
INVENTOR(S)    : Jiang It is certified that error appears in the above-identified patent and that said Letters Patent is hereby corrected as shown below:

Column 1,
Lines 8-9, delete "U.S. Pat. No. 6,076,056" as its redundant.
Line 64, replace "vectors" with -- vector --.

Column 5,
Line 14, replace "a" with -- and --.

Column 9,
Line 20, replace "systems" with -- system --.
Line 42, after "by" insert -- a --.

Column 16,
Line 1, replace "17" with -- 18 --.

Signed and Sealed this

Fourth Day of February, 2003

JAMES E. ROGAN
*Director of the United States Patent and Trademark Office*